(12) United States Patent
Goobar et al.

(10) Patent No.: US 6,791,745 B2
(45) Date of Patent: Sep. 14, 2004

(54) OPTICAL COMMUNICATION SYSTEM

(75) Inventors: Edgard Goobar, Stockholm (SE); Johan Sandell, Enskede (SE); Sven Wingstrand, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/204,236
(22) PCT Filed: Feb. 20, 2001
(86) PCT No.: PCT/EP01/01915
§ 371 (c)(1),
(2), (4) Date: Oct. 15, 2002
(87) PCT Pub. No.: WO01/65738
PCT Pub. Date: Sep. 7, 2001

(65) Prior Publication Data
US 2003/0053200 A1 Mar. 20, 2003

(30) Foreign Application Priority Data
Feb. 29, 2000 (EP) ............................. 00104153

(51) Int. Cl.[7] ................................. H01S 3/00
(52) U.S. Cl. ............... 359/341.41; 359/337.11
(58) Field of Search ............... 359/341.41, 337.11

(56) References Cited

U.S. PATENT DOCUMENTS

| 5,907,429 A | * | 5/1999 | Sugata | 359/341 |
| 6,144,487 A | * | 11/2000 | Michishita | 359/341 |
| 6,160,659 A | * | 12/2000 | Kinoshita | 359/337 |

FOREIGN PATENT DOCUMENTS

| EP | 0751637 A2 | * | 1/1997 |
| EP | 08157146 | * | 1/1998 |
| JP | 2000312046 A | * | 11/2000 |

* cited by examiner

Primary Examiner—Mark Hellner

(57) ABSTRACT

An amplifier arrangement includes an optical amplifier (10) with a source of injected power (11) for controlling amplifier gain. A feed forward gain control loop is provided with a weighting arrangement (50) capable of weighting the signal power at selected wavelengths input to the amplifier. In this way non-uniform spectral gain of the amplifier may be compensated for by selecting appropriate weighting factors. Thus the influence of wavelengths having a greater than average impact on the decay rate of the excited population within the amplifier is increased and vice versa. By tailoring the weighting arrangement to the specific class of amplifier utilised, and possibly to a specific amplifier within a class, amplifier gain can be precisely controlled and traffic signal power reliably held at a constant level regardless of link configuration changes.

8 Claims, 1 Drawing Sheet

OPTICAL COMMUNICATION SYSTEM

FIELD OF INVENTION

The invention is broadly directed to optical transmission systems utilising optical amplifiers. The invention has particular relevance to output power stabilisation in broadband optical amplifiers.

BACKGROUND ART

In optical communication systems, the limited dynamic range and sensitivity of optical receivers imposes certain requirements on the power accuracy of traffic channels. Optical amplifiers, a term which includes Erbium doped fibre amplifiers, fluoride doped fibre amplifiers, Erbium Ytterbium amplifiers, Raman amplifiers, Brillouin amplifiers, semiconductor amplifiers, and the like, are now widely used in such communication systems. A problem common to this class of amplifier is the dependence of gain on the input power. In wavelength division multiplexed (WDM) networks, this implies that for a fixed pump power, the amplifier gain is a function of the number of channels passing through the amplifier. Thus in reconfigurable networks, such as networks using the dynamic addition or drop of optical channels, the gain experienced by any one traffic channel will be affected by the configuration of the network as a whole. While slow power variations due to ageing and improper fibre handling are normally mitigated by relatively slow control feedback loops, transient suppression during network reconfiguration requires relatively fast control of the amplifier gain.

One method that is presently implemented to combat this problem is the use of a feed forward loop for active gain control. In such an arrangement, power input to the amplifier is measured and used to control the power of the amplifier pump. If the input signal power changes, the pump power injected into the amplifier is adjusted to keep the gain unchanged.

However, a characteristic of many optical amplifiers used in broadband systems such as WDM communication systems is that the gain varies depending on signal wavelength. Specifically, some input wavelengths may experience different gains and have a correspondingly different impact on the feed forward loop. This effect stems from the level of stimulated emission decay of excited states being higher when the input is at one wavelength than at another wavelength. The different levels of decay may also depend on the pumping levels. For example, in an Erbium doped fibre amplifier at high pumping levels, i.e. at a high level of population inversion, input wavelengths at around 1530 nm will provoke a higher decay rate and thus a higher gain than those at around 1550 nm at equal input powers. Thus for the same input powers a higher pump power must be applied in order to sustain this level of population inversion when the input signal is at 1530 nm. For the same amplifier at lower pumping levels, wavelengths around 1550 nm may experience a higher gain. Thus in this case for equal input powers a higher pump power would be required to sustain a steady population inversion for an input signal at 1550 nm. For different amplifiers and different pumping levels, a curve of the decay of stimulated emission of the excited population against wavelength may show several peaks centred around different wavelengths. The traffic channels on the link will thus experience varying signal power.

It is thus an object of the invention to provide an optical amplifier arrangement having stabile gain for signals over broad spectral range and that is substantially insensitive to rapid changes in network configuration.

SUMMARY OF INVENTION

According to the invention, there is provided an amplifier arrangement with a feed-forward gain-control loop with a weighting arrangement capable of weighting the signal power of selected wavelengths received by the amplifier. In this way the non-uniform spectral gain of the amplifier may be compensated for by appropriate selection of the weighting factor. Hence the influence of wavelengths having a greater than average impact on the decay rate of the excited population can be increased and similarly the influence of those wavelengths that have a smaller than average impact on decay rate can be reduced. By tailoring the weighting arrangement to the specific class of amplifier utilised, and possibly to a specific amplifier within a class, amplifier gain can be precisely controlled and traffic signal power reliably held at a constant level regardless of link configuration changes.

The weighting may be performed in a single step using a filter with a transfer function designed to vary with wavelength, such that the input power in predetermined wavelength bands is attenuated or amplified as required.

In an alternative arrangement, the extracted signal power is split into the required wavelength bands, and then subjected to a predetermined weighting function.

The invention further resides in a broadband optical communications link including at least one of these amplifier arrangements.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
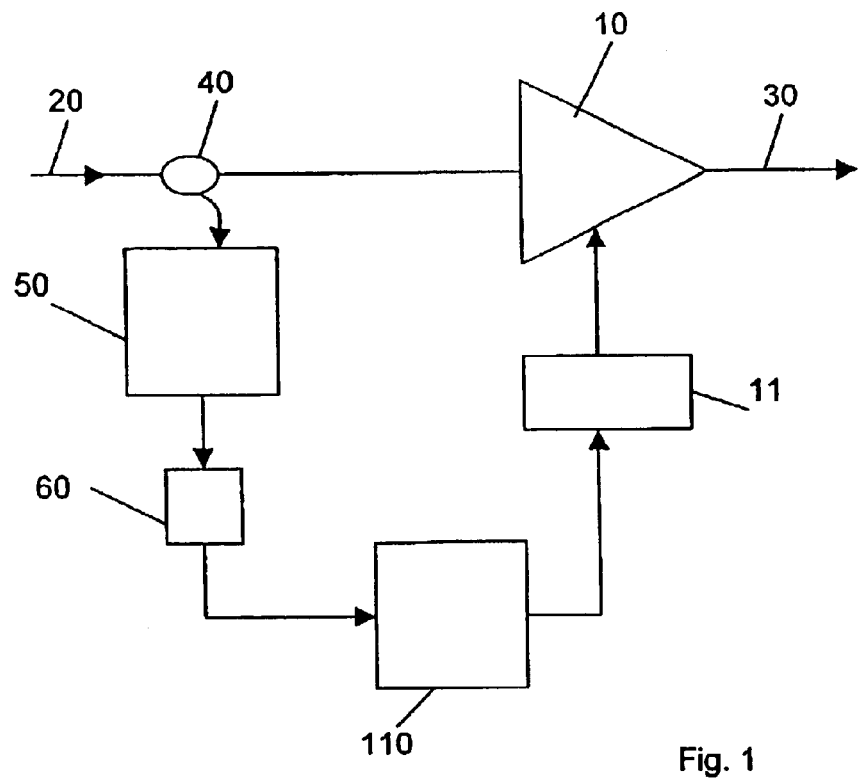
FIG. 1 schematically depicts an arrangement for stabilising gain of an optical amplifier in accordance with one embodiment of the invention.

FIG. 1 schematically depicts an amplifier arrangement connected in a wavelength division multiplexed (WDM) optical communications link. The amplifier arrangement includes an active fibre 10 connected at an input side to an upstream optical fibre 20 for receiving traffic signals and at an output side to a downstream optical fibre 30 for transmitting the amplified traffic signals.

The active fibre 10 is connected to a source of injected optical power 11, specifically a laser pump which pumps optical power into the active fibre 10 and thereby determines the gain of the amplifier. The pump power of this laser 11 is controlled by an injection current from a gain controller 110. Optical amplifiers that correspond to this configuration include rare earth doped amplifiers, such as erbium-doped amplifiers, fluoride doped amplifiers, Raman and Brillouin amplifiers and the like. An optical coupler or fibre tap 40 is connected to the upstream fibre 20 at the input side of the amplifier. This coupler 40 extracts a small amount of the input power from the received traffic signals. A filter 50 is connected to this coupler 40 and receives and filters the extracted input signals. A photodetector 60 connected to the filter 50 converts the optical signal output by the filter 50 into an electrical signal, preferably a current The photodetector 60 may be a photodiode, phototransistor, or any suitable opto-electric conversion device. The photodetector output is fed to the gain controller 110, which in turn adjusts the pump power 11, and thus the gain of the optical amplifier in order to maintain the traffic signal power substantially constant regardless of the number of traffic channels. The optical coupler, 40, filter 50, photodetector 60 and gain controller 110 together constitute a feed forward control loop for controlling the gain of the amplifier 10, 11 as a function of the input power.

This is necessary, since active fibre amplifiers, and also other forms of optical amplifiers, such as semiconductor amplifiers and the like, suffer from a common drawback, namely that the gain is dependent on the input power. If the number of traffic channels carried by the multi-channel optical link varies, the gain of the amplifiers will vary accordingly. However, the gain curve of these amplifiers is rarely flat over the whole spectral range of input signals. The impact on the gain resulting from the addition or removal of a particular channel will thus depend not only on the change in input power, but also on the wavelength band of that channel. For example, at high pumping levels Erbium-doped fibre amplifiers exert a higher gain on signals centred at around the wavelength of 1530 nm than signals centred at wavelengths of around 1550 nm. Hence, if a channel centred around 1530 nm is added to an optical link, the required pump power must be increased more than if a channel centred around 1550 nm is added. This is assuming that the amplifier is driven at a high overall gain.

The filter 50 compensates for the varying impact on amplifier gain by weighting or attenuating the different wavelengths in the extracted input signal differently. The filter 50 is essentially a band pass filter with a transfer function $H(\lambda)$ designed to pass the wavelengths of all channels that are or will be transmitted across the optical link with varying degrees of attenuation. More specifically, the transfer function $H(\lambda)$ is designed such that the power of signals at selected wavelengths or wavelength bands are attenuated or amplified to compensate for the opposite impact of these wavelengths on the gain of the optical amplifier to which the filter 50 is coupled. It will be appreciated that different classes of amplifier—and possibly individual amplifiers within the same class—will exhibit different gain characteristics across the spectral range of traffic signals. The filter transfer function $H(\lambda)$ is thus adapted to the specific characteristics of the amplifier utilised. For example, in an amplifier driven at high gain, i.e. with a high level of population inversion, a filter 50 connected to an Erbium doped fibre amplifier 10 will preferably have a transfer function that weights signals in the region of the wavelength 1530 higher than signals of wavelengths in the region of 1550 nm. In other words, signal wavelengths around 1550 are attenuated more than signals of wavelengths of 1530 nm. But it should be noted that other configurations are conceivable depending on how high the level of population inversion is. When this filtered or weighted signal is passed on to the photodetector 60, an electrical control signal results. This control signal is used by the gain controller 110 to alter the gain of the amplifier 10 by adjusting the pump power such that the traffic signal gain or gain per channel remains substantially constant.

In the preferred embodiment, the filter 50 is a dielectric filter designed using interference technology to provide a thin film filter that includes a number of quarter wavelength thin films stacked on top of one another, with the wavelengths selected to provide the desired wavelength attenuation pattern corresponding to the optical fibre amplifier utilised. It will be understood, however, that other structures may be used to form the filter. For example, the filter could be constituted by a series of fibre Bragg gratings, of single of cascaded Mach-Zehnder interferometers, be of the Fabry-Perot type or be constructed from a combination of the above techniques. It will be understood that the filter design is not limited to these examples, but that other appropriate constructions known to the person skilled in the art may also be employed.

Figure 2:
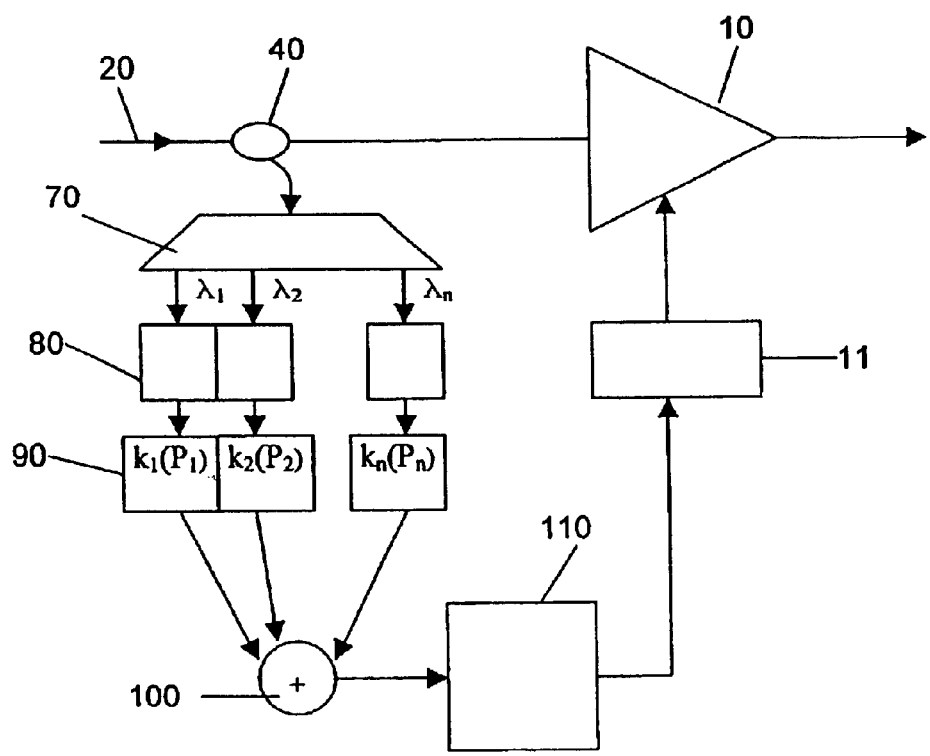
FIG. 2 schematically depicts an arrangement for stabilising gain of an optical amplifier in accordance with a further embodiment of the invention.

Turning now to FIG. 2 there is shown an alternative embodiment of the amplifier arrangement according to the invention. The basic arrangement shown in FIG. 2 is similar to that depicted in FIG. 1 and like parts have been denoted by like reference numerals. Accordingly, FIG. 2 shows an optical fibre amplifier 10 coupled to a source of injected optical energy provided by a laser pump 11, which is controlled by a gain controller 110. The active fibre 10 is connected to an input optical fibre 20 and also to an output optical fibre 30. A coupler 40 is arranged on the input optical fibre 20 and extracts a small portion of the input signal power. This extracted signal is fed to a demultiplexer 70, which is essentially a filter or series of filters arranged to split the signal power into selected wavelength bands designated by $\lambda_1$, $\lambda_2$–$\lambda_n$. It will be understood that other components may be used in place of the demultiplexor 70. These may include a diffraction grating, a photodiode array, which is described in K. Otsuka et al., ECOC'97, vol. 2, pp 147–150 (1997) or wavelength selective arrays. The optical power in each separate wavelength band $\lambda_n$ is then converted to electrical power using a photodetector 80, similar to the photodetector 60 utilised in the arrangement of FIG. 1. The resulting electrical signals are then each fed to a weighting module 90, which is preferably an amplifier. Each weighting module 90 amplifies or attenuates the spectrally resolved signal power $P_1$, $P_2$–$P_n$ by applying a predetermined amplitude weighting factor $k_1$, $k_2$–$k_n$ to the signal. It will be appreciated that the weighting modules may attenuate some wavelength bands, amplify other bands and leave some bands substantially unchanged. Hence the term 'amplifier' is used here to signify an amplifier arrangement that can apply a gain of less than unity as well as above unity. The number n and width of the wavelength bands $\lambda_1$, $\lambda_2$–$\lambda_n$ may correspond to those of the traffic channels transmitted over the optical link. Alternatively, the bands may be narrower or wider than the traffic channels. Preferably the bands are selected such that signal wavelengths that have a higher than average impact on the gain of the optical amplifier 10 are isolated from the rest, so that they may be amplified or attenuated independently of the other signal wavelengths.

The weighting factors are determined at or prior to the installation of the amplifier arrangement in the optical link. They are selected to compensate for variations in the gain experienced by different wavelengths passing through the fibre amplifier 10, 11 as a result of the particular characteristics of the amplifier. Taking the example of the Erbium doped fibre amplifier discussed above, this means that signals lying in a wavelength band centred around the wavelength of 1530 nm will be weighted with a higher weighting factor than signals in a wavelength band centred around 1550 nm, such that the resulting signal power of each weighted signal will have the same impact on the amplifier gain. The weighted signals are combined in an adder 100 and the total weighted signal power used to control the gain of the amplifier 10 by altering the injection current to the laser pump 11.

While in the arrangement shown in FIG. 2 the weighting function is performed on electrical signals, this weighting may be performed instead on optical signals, with the opto-electrical conversion using a photodetector occurring prior to or even after combining the weighted signals.

It will be appreciated that other classes of optical amplifiers that are subject to gain variations over the spectral range of input signals can benefit from such a wavelength dependent feed forward control loop. The precise configuration of the amplifier arrangement will naturally vary depending on the class of amplifier. In semiconductor amplifiers, the amplifier gain is controlled by an injection current. Hence in an amplifier arrangement incorporating a semiconductor amplifier, the injected power source denoted by reference numeral 11 in FIGS. 1 and 2 would be a source of injection current or pump current.

What is claimed is:

1. An optical amplifier arrangement comprising:
   an optical amplifier:
   a gain control arrangement; and
   a feed forward control loop including:
      means for measuring signal power input to the optical amplifier;
      means responsive to the measured signal power for adjusting the gain of the amplifier controlled by the gain control arrangement; and
      a weighting arrangement adapted to weight, selectively, the measured signal power as a function of wavelength prior to adjusting the amplifier pain, said weighting arrangement including:
         means for splitting the signal power into at least two separate wavelength bands;
         means for applying a weighting factor to the power in each spectrally resolved band; and
         means for combining the weighted signal powers.

2. The arrangement as claimed in claim 1, further comprising opto-electric conversion means disposed between the splitting means end the weighting means.

3. The arrangement as claimed in claim 1 or 2, wherein the splitting means includes a demultiplexer, diffraction grating, or photodiode array.

4. The arrangement as claimed in any one of claims 1 to 3, wherein the weighting means includes at least one amplifier.

5. An amplifier arrangement comprising:
   an optical amplifier having a source of injected power; and
   a feed forward control loop including:
      means for extracting signal power input to the optical amplifier;
      means responsive to the extracted signal power for adjusting the gain of the amplifier by altering the power injected by the source;
      a wavelength splitter coupled the to power extracting means for splitting the measured input power into at least two signals in separate wavelength bands; and
      means arranged between the wavelength splitter and the gain adjusting means for applying a weighting factor to the power in each spectrally resolved band.

6. The arrangement as claimed in claim 5, further comprising opto-electric conversion means disposed between the wavelength splitter and the weighting means.

7. The arrangement as claimed in claim 5 or 6, wherein the wavelength splitter includes a demultiplexer, diffraction grating, or photodiode array.

8. An arrangement as claimed in any one of claims 5 to 7, wherein the weighting means includes at least one amplifier.

* * * * *

UNITED STATES PATENT AND TRADEMARK OFFICE
CERTIFICATE OF CORRECTION

| | |
|---|---|
| PATENT NO. | : 6,791,745 B2 |
| APPLICATION NO. | : 10/204236 |
| DATED | : September 14, 2004 |
| INVENTOR(S) | : Goobar et al. |

It is certified that error appears in the above-identified patent and that said Letters Patent is hereby corrected as shown below:

In Column 5, Line 29, in Claim 1, delete "pain," and insert -- gain, --, therefor.

In Column 6, Line 20, in Claim 5, delete "the to" and insert -- to the --, therefor.

Signed and Sealed this

Twenty-seventh Day of May, 2008

JON W. DUDAS
*Director of the United States Patent and Trademark Office*